DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 4, 1975

931 O.G. 9

T931,003

POLYMERIC SOAPS

Michael Fryd, Philadelphia, and Achim R. Krueger, Upper Darby, Pa.

Continuation of application Ser. No. 372,844, June 22, 1973, which is a continuation of application Ser. No. 91,536, Nov. 20, 1970, both now abandoned. This application Dec. 17, 1973, Ser. No. 425,074

Int. Cl. C08f *15/02*

U.S. Cl. 260—79.3 M

No Drawing. 15 Pages Specification

Polymeric soaps, useful as thickeners in paints, which are random copolymers of at least two monomers, one bearing a pendant radical which solubilizes the polymer in whatever liquid is used as a carrier, and the other bearing a pendant long-chain radical which gives the soap its thickening effect.